United States Patent
Lovett et al.

(10) Patent No.: US 9,321,686 B2
(45) Date of Patent: Apr. 26, 2016

(54) REINFORCEMENT FIBER COATING COMPOSITIONS, METHODS OF MAKING AND TREATING, AND USES FOR IMPROVED ADHESION TO ASPHALT AND PORTLAND CEMENT CONCRETE

(71) Applicant: FORTA CORPORATION, Grove City, PA (US)

(72) Inventors: Jeffrey B. Lovett, Harrisville, PA (US); Clifford Norman MacDonald, Inver Grove Heights, MN (US); Daniel T. Biddle, Grove City, PA (US)

(73) Assignee: Forta Corporation, Grove City, PA (US)

( * ) Notice: Subject to any disclaimer, the term of this patent is extended or adjusted under 35 U.S.C. 154(b) by 0 days.

(21) Appl. No.: 14/209,247

(22) Filed: Mar. 13, 2014

(65) Prior Publication Data

US 2014/0275350 A1    Sep. 18, 2014

Related U.S. Application Data

(60) Provisional application No. 61/787,352, filed on Mar. 15, 2013, provisional application No. 61/787,418, filed on Mar. 15, 2013.

(51) Int. Cl.

| | |
|---|---|
| *C04B 26/06* | (2006.01) |
| *C04B 28/04* | (2006.01) |
| *C09D 133/12* | (2006.01) |
| *C04B 26/26* | (2006.01) |
| *C04B 20/10* | (2006.01) |
| *C09D 4/06* | (2006.01) |
| *B32B 13/02* | (2006.01) |
| *C04B 103/00* | (2006.01) |

(52) U.S. Cl.
CPC .............. *C04B 26/06* (2013.01); *C04B 20/1037* (2013.01); *C04B 26/26* (2013.01); *C04B 28/04* (2013.01); *C09D 4/06* (2013.01); *C09D 133/12* (2013.01); *C04B 2103/0046* (2013.01); *C04B 2103/0047* (2013.01); *Y02W 30/97* (2015.05)

(58) Field of Classification Search
CPC   C04B 26/06; C04B 20/1033; C04B 20/1037; C09D 133/12; B32B 13/02
USPC .............................. 524/8, 832, 850, 853, 854
See application file for complete search history.

(56) References Cited

U.S. PATENT DOCUMENTS

| | | |
|---|---|---|
| 3,318,826 A | 5/1967 | Bridgeford |
| 4,346,135 A | 8/1982 | Arnheiter et al. |
| 5,460,649 A | 10/1995 | Strassman |
| 5,552,472 A | 9/1996 | Kerr et al. |
| 6,753,081 B1 | 6/2004 | Lovett et al. |
| 7,168,232 B2 | 1/2007 | Lovett et al. |
| 2003/0046770 A1 | 3/2003 | Sanduja et al. |

FOREIGN PATENT DOCUMENTS

EP    1 083 274 A1    3/2001

OTHER PUBLICATIONS

International Search Report for Corresponding Application—PCT/US2014/029045.

*Primary Examiner* — Fred M Teskin
(74) *Attorney, Agent, or Firm* — Eckert Seamans Cherin & Mellott, LLC; Carol A. Marmo

(57) ABSTRACT

The invention relates to coating compositions, treated reinforced fibers, reinforced asphalt and portland cement concrete and methods for producing the same. The coating compositions include monomer, prepolymer or mixtures thereof, and graft initiator. The monomer and/or prepolymer include at least one functional group selected from the group consisting of hydroxyl, carboxyl, amino and ester. The graft initiator includes metallic salt.

14 Claims, 3 Drawing Sheets

Figure 1:
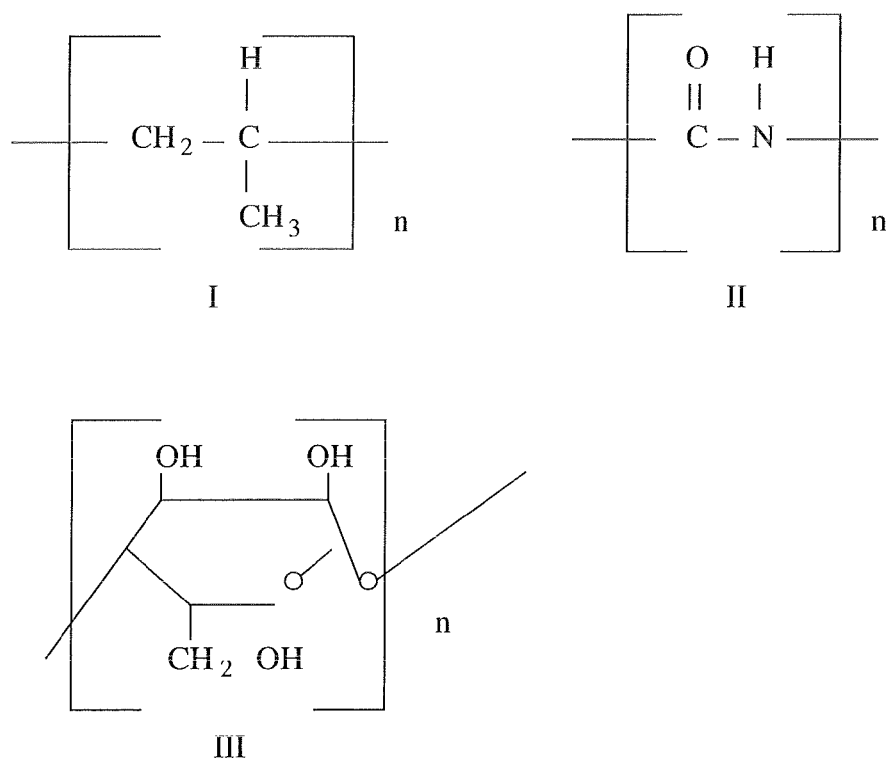

$$S-H + CA^+ \longrightarrow S + H^+ + CA \qquad (1)$$
Substrate  Chemical Activator  Free Radical Formation $$S + CH_2=CH \longrightarrow S-CH_2-CH \qquad (2)$$
$$\qquad\qquad |\qquad\qquad\qquad\qquad |$$
$$\qquad\qquad X\qquad\qquad\qquad\qquad X$$
$$\qquad\quad \text{Monomer}\qquad\qquad\quad \text{Initiation}$$

$$S-CH_2-CH + n(CH_2=CH) \longrightarrow S-(CH_2=CH)n-CH_2-CH \qquad (3)$$
$$\qquad |\qquad\qquad\qquad |\qquad\qquad\qquad\qquad |\qquad\qquad |$$
$$\qquad X\qquad\qquad\qquad X\qquad\qquad\qquad\qquad X\qquad\qquad X$$
$$\qquad\qquad\qquad\qquad\qquad\qquad\qquad\quad \text{Propagation}$$

$$ROOH + CA \longrightarrow RO + OH^- + CA^+ \qquad (4)$$
Peroxide $$S-(CH_2-CH)n-CH_2-CH + RO \longrightarrow S-(CH_2-CH)n-CH_2-CHOR \qquad (5)$$
$$\qquad\quad |\qquad\qquad\quad |\qquad\qquad\qquad\qquad\quad |\qquad\qquad\quad |$$
$$\qquad\quad X\qquad\qquad\quad X\qquad\qquad\qquad\qquad\quad X\qquad\qquad\quad X$$

OR $$S-(CH_2-CH)n-CH_2-CH-CH-CH_2-(CH_2-CH)n-S \qquad (6)$$
$$\qquad\quad |\qquad\qquad\quad |\quad\; |\qquad\qquad\qquad |$$
$$\qquad\quad X\qquad\qquad\quad X\; X\qquad\qquad\qquad X$$

$$S-(CH_2-CH)n-S$$
$$\qquad\qquad |$$
$$\qquad\qquad X_{m+n+2}$$

FIG. 3

REINFORCEMENT FIBER COATING COMPOSITIONS, METHODS OF MAKING AND TREATING, AND USES FOR IMPROVED ADHESION TO ASPHALT AND PORTLAND CEMENT CONCRETE

CROSS-REFERENCE TO RELATED APPLICATIONS

This application claims the benefit of priority to U.S. Provisional Patent Application No. 61/787,352 entitled "REINFORCEMENT FIBER COATING COMPOSITIONS, METHODS OF MAKING AND TREATING, AND USES FOR IMPROVED ADHESION TO PORTLAND CEMENT CONCRETE" filed in the United States Patent and Trademark Office on Mar. 15, 2013, and U.S. Provisional Patent Application No. 61/787,418 entitled "REINFORCEMENT FIBER COATING COMPOSITIONS, METHODS OF MAKING AND TREATING, AND USES FOR IMPROVED ADHESION TO ASPHALT CEMENT CONCRETE", filed Mar. 15, 2013, which is incorporated herein by reference.

BACKGROUND OF THE INVENTION

1. Field of the Invention

This invention relates to coating compositions and methods for treating reinforcement fibers. The invention includes preparing the coating compositions, applying the coating compositions to form treated reinforcement fibers and, employing the treated reinforcement fibers in asphalt and portland cement concrete materials. The treated reinforcement fibers provide advantages as compared to non-treated reinforcement fibers including, but not limited to, improved adhesion between the treated reinforcement fibers and, between the treated reinforcement fibers and asphalt and portland cement concrete.

2. Background of the Invention

Reinforcement components, such as fibers, are generally known in the art. Further, addition of these reinforcement components to building materials, such as concrete, including asphalt and portland cement concrete and the like, is known to add strength, toughness, and durability to improve the integrity of the material properties of the concrete. For example, a reinforcement component is typically added to concrete to reduce the effect of two main structural deficiencies: 1) low tensile strength and 2) low strain at fracture. The tensile strength of concrete is relatively low because concrete, when formed, normally contains numerous micro-cracks. It is the rapid propagation of these micro-cracks under applied stress that is responsible for the low tensile strength of the material.

Known reinforcement components include, for example, various gauges of wire mesh or reinforcement fibers, such as, asbestos fibers, glass fibers, steel fibers, mineral fibers, natural fibers, synthetic fibers (such as polymer and aramid fibers), and cellulose fibers. Some reinforcement fibers are better suited for particular applications than others. There are disadvantages associated with these known reinforcement components. For example, they generally do not exhibit good adhesion to concrete. Exposure of these reinforcement components to various environmental conditions, such as alkaline media, can cause the reinforcement components to degrade. Some advances have been made in the area of reinforcement components to provide improved adhesion. For example, additive solutions can be added to fiber/concrete mixtures to improve adhesion. However, even with the additive solutions, reinforcement fibers still have disadvantages that weaken or, otherwise, limit their effectiveness.

Furthermore, it is generally known that surface properties of shaped articles such as polymeric films and fibers can be modified by a graft polymerization process. In this process, the article is treated with a free radical generating agent, such as organic peroxide or high energy radiation and then, contacted with an ethylenically unsaturated monomeric material under conditions wherein the monomer or graft polymer chain is covalently bonded to the substrate of the article.

There are, however, disadvantages associated with conventional graft polymerization processes. For example, films formed by these processes can be prone to delamination under certain conditions. In order to improve the integrity of a film deposited on a surface of a substrate, the substrate may be treated to grow a polymer coating using a chemical grafting process. The resulting coating is covalently bonded to the substrate and is resistant to delamination. Chemical grafting involves the activation of the substrate. The substrate is activated which causes chains of monomers linked by carbon-carbon bonds to grow on the substrate. The growth has been characterized as "whiskers". These whiskers can impart desirable properties to the substrate without imparting negative properties to the substrate.

In general, a substrate material possesses certain hydrogen atoms which are more active than the "bulk hydrogen atoms" in the material. Examples of relatively more active hydrogen atoms include the tertiary hydrogen in polypropylene, the amide hydrogen in proteins, and the hydroxyl hydrogen in polysaccharide. The chemical grafting process uses graft initiators which have the capacity to remove the active hydrogen atoms and initiate the growth of polymer chains at the site of the removed hydrogen atoms. This process results in a covalent bond formed between the grafted polymer and the substrate. Further, the process can result in a coating or film chemically grafted, i.e., covalently bonded to the substrate.

Accordingly, there is a need for reinforcement fibers that impart improved structural properties to building materials to which they are added and, in particular, the need exists for treated reinforcement fibers having a coating or film chemically applied thereto such that when the treated reinforcement fibers are added to concrete materials, the result is improved adhesion between the fibers and improved adhesion to the concrete, as compared to untreated reinforcement fibers known in the art. Further, it is desired that application of the coating or film can be carried out with minimal surface preparation of the reinforcement fibers and can result in a relatively thin coating layer on the surface thereof.

SUMMARY OF THE INVENTION

In one aspect, the invention provides a composition for treating reinforcement fibers with a chemically grafted coating. The composition includes at least one component selected from the group consisting of monomer, prepolymer, graft initiator and mixtures thereof. In certain embodiments, the composition includes graft initiator and at least one of monomer and prepolymer. The monomer is selected from the group consisting of urethane monomer, acrylic monomer, vinyl monomer and mixtures thereof. The prepolymer is selected from the group consisting of urethane prepolymer, acrylic prepolymer, vinyl prepolymer and mixtures thereof. The monomer and prepolymer can further include at least one functional group selected from the group consisting of hydroxyl, carboxyl, amino and ester. The graft initiator can include metallic salt. The graft initiator can be selected from the group consisting of silver nitrate, silver perchlorate, ferrous ammonium sulfate, titanium and mixtures thereof. The graft initiator can be in the form of a solution. The graft initiator solution can include water.

The composition can further include catalyst. The catalyst can be selected from peroxide acid, perbenzoate and mixtures thereof.

In another aspect, the invention provides a reinforced asphalt and portland cement concrete composition. The composition includes a plurality of reinforcement fibers each having an outer surface and a treatment layer formed on the outer surface. The treatment layer includes a component selected from the group consisting of monomer, prepolymer and mixtures thereof, wherein said component comprises at least one functional group selected from the group consisting of hydroxyl, carboxyl, amino and ester; and a graft initiator comprising metallic salt. The composition further includes aggregate and binder.

In another aspect, the invention provides a method of reinforcing asphalt and portland cement concrete. The method includes providing reinforcement fiber substrate having an outer surface; applying graft initiator to said outer surface of said reinforcement fiber substrate; applying to said graft initiator a component selected from the group consisting of monomer, prepolymer and mixtures thereof, said component comprising at least one functional group selected from the group consisting of hydroxyl, carboxyl, amino, ester and mixtures thereof to form a treated fiber; and adding said treated fiber to the asphalt and portland cement concrete.

DETAILED DESCRIPTION OF THE INVENTION

This invention relates to coating compositions, methods for preparing the coating compositions, methods for applying or depositing the coating compositions to form a coating, use of the coatings to treat or surface-modify reinforcement fibers, and incorporation of the treated or surface-modified reinforcement fibers to produce reinforced concrete.

The term "concrete" as used herein and the claims means asphalt and portland cement concrete and the like.

The coating compositions are deposited or applied to a reinforcement fiber substrate to form a coating thereon by employing the mechanism of chemical grafting. In general, chemical grafting includes applying or depositing a graft initiator on the surface of a substrate. In this invention, a graft initiator is applied or deposited on a surface of the reinforcement fibers. The graft initiator may be applied or deposited using various conventional techniques known in the art. The graft initiator exposes active sites on the surface of the substrate causing the surface of the reinforcement fibers to be activated. For example, a hydrogen atom can be abstracted from a hydrogen-containing group giving rise to free radicals. These free radicals initiate graft polymerization. Monomers and/or prepolymers linked by carbon-carbon bonds attach to reactive sites followed by chain propagation, whereby monomer/polymer branches are formed. The growth can be characterized as "whiskers". As a result, a monomeric and/or polymeric treatment coating is formed on the surface of the reinforcement fibers. The monomer and/or polymer coating is chemically, e.g., covalently, bonded to the reinforcement fiber substrate and therefore, without intending to be bound by any particular theory, it is believed that the coating exhibits improved resistance to delamination as compared to conventional surface films or coatings. Further, it is believed that the surface energy of the monomer and/or polymer coating provides for improved adhesion to the concrete as compared to the surface energy of the untreated or uncoated fiber, such that a bond is formed between the treated or coated fiber and the concrete.

When added to asphalt and portland cement concrete compositions, the use of treated reinforcement fibers can provide at least one of the following desirable changes to the asphalt and portland cement concrete when it is field placed and set: (i) increased strength, durability and toughness, and (ii) reduced or minimal formation of cracks over time. Furthermore, the use of treated reinforcement fibers in accordance with this invention can result in improved adhesion between a plurality of treated reinforcement fibers themselves and between the treated reinforcement fibers and the asphalt and portland cement concrete, as compared to the use of untreated reinforcement fibers.

While applying the coating composition to reinforcement fibers may result in improved desirable properties, e.g., improved adhesion, when the treated reinforcement fibers are added to the asphalt and portland cement concrete, the inherent structure, characteristics and properties, of the reinforcement fibers are not otherwise changed as a result of them being treated with the coating composition.

There is a wide variety of reinforcement fibers known in the art which can be used in the invention. Suitable reinforcement fibers for use in the invention include synthetic or natural fibers. Natural fibers can include wood-derivative fibers and mixtures thereof. Synthetic fibers can include, but are not limited to, polymer fibers, aramid fibers and mixtures thereof. Polymer fibers can include, but are not limited to, polyolefin fibers such as polypropylene fibers and polyethylene fibers, polyamide fibers such as nylon fibers, polyvinyl-chloride fibers, polyester fibers and mixtures thereof. In certain embodiments of the invention, the reinforcement fibers include a blend of aramid fibers and polyolefin fibers, such as a blend of aramid fibers, polyethylene fibers and polypropylene fibers.

The reinforcement fibers can be used in various shapes, sizes, and forms. The reinforcement fibers, for example, can be flat, such as in the form of a sheet, or cylindrical, such as in the form of a tube or cord. The reinforcement fibers may include a deformation, such as a one or more crimps, in the flat or cylindrical length of the fiber. The deformation, e.g., crimp(s), can form a fiber having different shapes such as z-shaped, s-shaped, w-shaped and wedge-shaped fibers. In certain embodiments, loose fibers can be difficult to handle, and therefore, it may be desirable to configure and control the fibers, such as to improve the ease of handling, e.g., for adding the fibers to a concrete mixing process. Accordingly, the tubes or cords can be bundled together in a circumferential wrap and cut to a predetermined length using conventional techniques and methods known for cutting fibers. The length of the fibers can vary widely, and the length can be such that the fibers are dispersible in a concrete mixture. In non-limiting embodiments, the fibers may be cut into a length within the range of about 19 to 60 mm.

The fibers, individually or together in various combinations and proportions, can be fibrillated (i.e., pulled apart to form a net like structure) or non-fibrillated. The fibers can be configured in a predetermined number of twists and turns. For example, the fibers suitable for use in the invention can include a fiber component, as disclosed in U.S. Pat. No. 7,168,232 ("the '232 patent"). The fiber component can be a twisted bundle of multiple strands of a non-fibrillating monofilament. The '232 patent further discloses the twisted fiber component with another fiber component, discrete from the twisted fiber component, that is fibrillated. In U.S. Pat. No. 4,346,135, a fibrous reinforcing means, including at least two various groups of fibrous articles, is disclosed. At least one of the groups consists of fibrous articles in the form of a closed filamentary net. In U.S. Pat. No. 6,753,081, a synthetic fiber blend is disclosed. The synthetic fiber blend includes a first fiber component formed of a homopolymer polypropylene fiber, and a second fiber component is a copolymer formed of a polypropylene and a high-density polyethylene. The disclosures of U.S. Pat. Nos. 7,168,232; 6,753,081; and 4,346,135 are incorporated herein by reference.

In accordance with certain embodiments of the invention, the coating composition includes graft initiator and a component which includes at least one of monomer and prepolymer. The monomer can be selected from those known in the art. Suitable monomers include urethane monomers, acrylic monomers, vinyl monomers and mixtures thereof. In certain embodiments, the monomer includes one or more functional groups selected from hydroxyl, carboxyl, amino, ester and mixtures thereof. In certain embodiments, the monomer includes acrylate, such as methacrylate or diacrylate, such as dimethacrylate.

Suitable prepolymers include urethane prepolymers, acrylic prepolymers, vinyl prepolymers and mixtures thereof. In certain embodiments, the prepolymer includes one or more functional groups selected from hydroxyl, carboxyl, amino, ester, acrylic and mixtures thereof. Further, in certain embodiments, the prepolymer is water dispersible.

In certain embodiments, the monomer and/or prepolymer include functionality selected from the groups of acrylate, hydroxyl, carboxyl, epoxy, urethane, amide, amine, anhydride and combinations thereof.

The amount of monomer and/or prepolymer in the composition can vary and can depend on the particular selection of each of these compounds.

In certain embodiments, the coating composition includes either monomer or prepolymer. In certain other embodiments, the coating composition includes a mixture or blend of monomer and prepolymer. In one embodiment, the monomer is an acrylate monomer, such as methacrylate monomer, and the prepolymer is a water dispersible polymer with functional groups, such as carboxyl, hydroxyl, amino and acrylic.

The graft initiators for use in the invention include metal ions, such as but not limited to iron (Fe+++ and Fe++), silver (Ag+), cobalt (Co++), and copper (Cu++). Suitable graft initiators for use in the invention include metallic salts. A wide variety of metallic salts are known in the art. In certain embodiments, the graft initiator is selected from silver nitrate, silver perchlorate, ferrous ammonium sulfate, titanium and mixtures thereof. The graft initiator can be in the form of a solution. The solution can include the graft initiator and water. The amount of graft initiator can vary. The graft initiator is typically present in a low concentration or small amount. In certain embodiments, an amount of from 5 ppm to 10 ppm is used. In certain other embodiments, the graft initiator is present in a concentration ranging from about 0.01 to about 1.0%, or from about 0.001 to about 0.1% by weight based on the total weight of the prepolymer and/or monomer present.

Optionally, the composition can further include catalyst. In general, the catalyst functions to ionize or regenerate the graft initiator. The catalyst can be selected from those known in the art. In certain embodiments, the catalyst is peroxide, including, for example, hydrogen peroxide and other organic peroxide, such as, benzoyl peroxide, methyl ethyl ketone peroxide, 1-butyl hydroperoxide and derivatives and combinations thereof. The catalyst can be employed in various amounts. In certain embodiments, peroxide acid or perbenzoate is used as catalyst. The catalyst can be present in varying amounts. In certain embodiments, the concentration of catalyst ranges from about 0.1 to about 5% or greater, or from about 0.05 to about 1.0%, by weight based on the weight of the composition.

The coating composition is applied to the reinforcement fiber by chemical grafting to produce a reinforcement fiber having a treated or modified surface. The grafting process may be conducted by preparing a grafting solution and applying the grafting solution to the substrate, e.g., reinforcement fiber, by any conventional method known in the art, including but not limited to, brushing, spraying, dipping, spin coating, vapor deposition and the like. The solution may include solvent that is compatible with the reagents selected for the grafting. Solvents are selected depending on the prepolymers and/or monomers employed, and can include polar solvents such as water, water soluble alcohols, ethers, esters, ketones, and derivatives and mixtures thereof, and nonpolar solvents such as organic solvents, e.g., aromatic solvents such as benzene and its derivatives, alkanes and/or alkenes and their derivatives, halogenated organic solvents, and other readily available solvents.

In general, as previously disclosed, a chemical grafting process includes attaching one material to another material by means of a chemical bond, and involves activating a substrate, e.g., a reinforcement fiber, and growing monomers, prepolymers or polymers linked by carbon bonds on the substrate.

Figure 2:
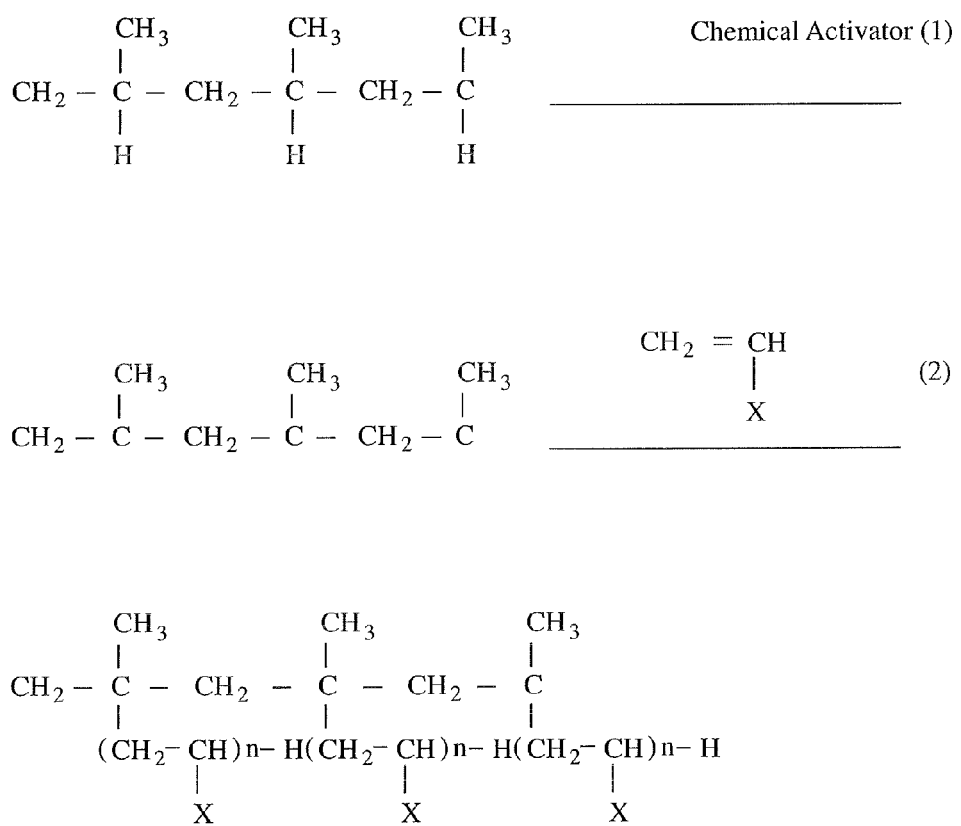

FIG. 1 shows a propylene structure (I) which possesses a tertiary hydrogen that is more reactive than bulk hydrogen atoms. Further, a protein structure (II) and a polysaccharide structure (III) are each shown which possess an amide hydrogen in (II) and a hydroxyl hydrogen in (III) that are each more reactive than bulk hydrogens. The chemical activator of the invention is capable of removing these active hydrogens to initiate the growth of polymer chains at the site from where the active hydrogens are removed. FIG. 2 shows generally the removal of active hydrogens to initiate the growth of polymer chains for a polypropylene substrate, such as for polypropylene reinforcement fiber.

FIG. 3 shows a mechanism of chemical grafting in accordance with certain embodiments of the invention wherein in step (1) the chemical activator CA (e.g., graft initiator), induces radical formation in the substrate S (e.g., reinforcement fiber). In step (2), monomer X is attached to the active site formed by removal of the hydrogen to initiate growth. The selection of X governs the property or properties that are obtained. Optionally, a mixture of monomers are employed, and more than one property of the substrate can be modified or enhanced in a single processing step. In step (3), propagation of the polymer chains on a backbone chain of the substrate S (e.g., reinforcement fiber) is initiated and continues at the reaction sites from where the reactive hydrogen molecules were removed to form a polymeric coating or film. Step (4) illustrates that the graft initiator can be optionally regenerated. The process then may be terminated by radical combination as shown in reaction steps (5) and (6). As shown in FIG. 3, n and m are integers defining subunit number, and can be the same or different.

In the chemical grafting process, the grafting initiator prepares the surface of the reinforcement fiber substrate such that the substrate is receptive to the graft. As discussed, the graft initiator exposes active sites on the surface of the reinforcement fiber to initiate the grafting process. Application of the graft initiator to the outer surface of the reinforcement fiber can be accomplished by conventional techniques known in the art such as, for example, spraying, rolling or dipping. The graft initiator can be applied at ambient temperatures and normal atmospheric conditions. In certain embodiments, the film/coating formed by the graft initiator can be air dried and in certain other embodiments, the film/coating can be dried using heat or an energy source, such as UV or infrared light. The monomer and/or prepolymer component is then applied at least partially to the outer surface of the graft initiator coating/film to form a treatment coating/film on the reinforcement fiber substrate. The thickness of each of the graft initiator coating/film and the treatment coating/film can vary, and can depend on the specific components selected for use in the coating composition and/or the particular substrate on which it is being applied. The coatings/films formed by chemical grafting can be relatively thin and still provide superior adhesion. In certain embodiments of the invention, the layer thickness is about 0.5 mils. A relatively thin layer is effective to produce the increased adhesion property which is desired. However, there may be certain situations, wherein a thicker layer is needed in order for the increased adhesion property to be realized. In accordance with the invention, the coating composition can be applied in a wide range of thicknesses to accommodate a variety of uses.

The coating compositions of the invention and the coatings formed therefrom may be dried and/or cured. The drying process may include air drying and the curing process may be conducted at room temperature or may include curing at an elevated temperature employing various heat sources known in the art.

In certain embodiments, it may be sufficient to deposit the treatment composition only on the surface of the reinforcement fiber substrate and in certain other embodiments, it may be necessary for the treatment composition to penetrate at least an adequate depth into the substrate or even throughout the substrate in order for the substrate to realize the benefits of the treatment composition.

In general, conventional coatings which are applied to a substrate are adhered to the substrate by simple physical forces which can be easily broken and cause peeling or delamination of the coating. Since, in the invention, the graft initiator creates reaction sites on the reinforcement fiber substrate for free radical polymerization, the reinforcement fiber substrate is receptive to attachment of monomer and/or prepolymer, and the coating or film formed is at least partially chemically bonded, i.e., chemically grafted, to the reinforcement fiber substrate (e.g., the outer surface of the reinforcement fiber). In chemical grafting, the chemical, covalent bonds which bind the layer or film to the substrate produce superior adhesion and reduce or minimize degradation of the treatment.

Furthermore, without intending to be bound by any particular theory, it is believed that as a result of applying the coating composition to the reinforcement fiber, the surface energy of the treated reinforcement fiber is altered or modified (as compared to the surface energy of untreated reinforcement fiber) and causes improved adhesion between the treated reinforcement fibers themselves and between the treated reinforcement fibers and concrete. As such, the treated reinforcement fiber is not easily removable from concrete which is field placed and set.

In certain embodiments, the coating composition can be used to connect one reinforcement fiber substrate to another reinforcement fiber substrate to form a laminated reinforcement fiber. Conventional adhesives that are used for lamination typically fail when temperature changes occur or may fail in shear when the layers constituting the laminate have different coefficients of thermal expansion. The graft initiators used in the invention can be effective to graft di-functional monomers such that one of the carbon-carbon chains will attach itself to one of the substrates at temperature $T1$ and the other end will do the same at a temperature $T2$, wherein $T2$ is higher than $T1$ It is known that carbon-carbon chains are in the form of a helix which can extend and contract depending on temperature.

In accordance with certain embodiments, the treated reinforcement fibers of the invention are introduced during preparation of concrete, e.g., in a concrete mixture, and prior to it being field placed and set. The treated reinforcement fibers can be introduced into a concrete mixture during various steps and at a variety of locations in the manufacture process. For example, the treated reinforcement fibers can be added in a concrete mixing machine or associated machinery, or in a hopper, or in a transportation vehicle, or after discharge from the mixing machine or associated machinery, or the hopper or the transportation vehicle. The treated reinforcement fibers can be added at these various steps in the process provided that there is sufficient mixing that occurs to adequately incorporate the treated reinforcement fibers into the concrete material.

In addition to the treated reinforcement fibers, compounds used in producing asphalt and portland cement concrete include, but are not limited to, fine and coarse aggregate, such as but not limited to sand and rock, and a binder that holds together the aggregate. The binder is often referred to in the art as cement. Other additives may also be added to the asphalt and portland cement concrete material (for example, in the concrete mixing machine), such as, for example, lime powder. The process of manufacturing asphalt and portland cement concrete can include a batch or continuous process. In the batch process, the treated reinforcement fibers can be added to the mixing chamber, having mixing blades, of the concrete mixing machine prior to introducing aggregate and liquid cement. In the continuous process, wherein a drum mixer is used, treated reinforcement fibers can be added to the process at any time prior to the introduction of liquid cement. The manufacture of asphalt cement concrete consists of a thermal process, and therefore, includes heating the ingredients, such as in the chamber of the concrete mixing machine The temperature of the concrete can vary and can include those temperatures typically used in commercially-operated concrete manufacturing facilities. In an embodiment of the present invention, the temperature can be within a range of about 212° F. to 375° F., or higher than 700° F.

The treated reinforcement fibers can be added to the asphalt and portland cement concrete mixture in varying amounts. Typically, the amount added is such that desired properties of the concrete are achieved. In certain embodiments, the amount of treated reinforcement fibers added to the asphalt and portland cement concrete mixture can be such that the treated reinforcement fibers constitute at least 10.0 percent or greater by volume per ton of concrete. In certain embodiments, the amount of treated reinforcement fibers can be in a range of from about 0.0001 percent to about 5.0 percent by volume per ton of the concrete.

The treated reinforcement fibers can be incorporated into the manufacture of various asphalt and portland cement concrete building materials and products used for building or construction, such as, for example, structural pavements, airport runways and tarmacs, bridge deck overlays, floors, and pre-cast concrete products. The treated reinforcement fibers may also be used for repair, rehabilitation, retrofit, and renovation of existing products or structures, such as, for example, in overlays, and repairs of airport pavements, bridge decks, parking areas, roadways, and the like, including patching and filling potholes.

In addition to reinforcement, incorporation of the treated reinforcement fibers in, for example, cast asphalt and portland cement concrete, modifies the cracking mechanism and reduces the propagation of micro-cracking caused by shrinkage. Furthermore, the treated reinforcement fibers are capable of carrying a load across the crack. As a result, the asphalt and portland cement concrete may have at least one change in its material properties, such as toughness, residual load carrying ability after the first crack, and impact resistance. Moreover, it is believed that the treated reinforcement fibers can produce asphalt and portland cement concrete having improved strength compared to concrete using non-treated reinforcement fibers, such that the asphalt and portland cement concrete containing treated reinforcement fibers can be suitable for locations where the asphalt and portland cement concrete will experience both high and low temperatures, and areas subjected to heavy loadings (e.g., high traffic areas) and heavy concentrations of truck traffic, as well as many other uses.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

EXAMPLES

Example 1

The following ingredients were combined in a container to form a liquid reinforcement fiber treatment/coating composition in accordance with certain embodiments of the invention.

| Ingredient Name | Parts by Weight |
| --- | --- |
| Flurosurfactant APES-70S | 0.50 |
| Water | 400.00 |
| Hardlen EW 8511 | 100.00 |
| Titanium IV tris aminoethyl amion ethanol DR44 | 4.00 |
| Diethylene glycol monobutylether | 10.0 |
| Alkoxylated tri acrylate SR9035 | 2.00 |
| Sodium vinyl suflfonate | 0.50 |
| Polyethylene glycol dimethacrylate SR 344 | 0.50 |
| Ureaperoxide 1% solution in water | 0.50 |
| Styrene/acrylate copolymer pliotec SA40 | 25.00 |
| Silver perchlorate 0.1% solution in water | 0.10 |

Example 2

The following ingredients were combined in a container to form a liquid reinforcement fiber treatment/coating composition in accordance with certain embodiments of the invention.

| Ingredient Name | Parts by Weight |
| --- | --- |
| Flurosurfactant FC 4430 | 0.50 |
| Water | 400.00 |
| Modified polyolefin Advantis 510W | 125.00 |
| Titanium IV ros propenolate methyl amino ethanol LICA 97 WE50 DR44 | 45.00 |
| Diethylene glycol monobutylether | 10.0 |
| Monomer sodium vinyl suflfonate | 1.00 |
| Alkoxylated urethane acrylate SR 9035 | 0.50 |
| Monomer Silane A1120 | 0.50 |
| Ureaperoxide 1% solution in water | 0.50 |

-continued

| Ingredient Name | Parts by Weight |
| --- | --- |
| Silver perchlorate 0.1% solution in water | 0.10 |
| Acrylic prepolymer Acrygeon DV 300 | 30.00 |

Example 3

The following ingredients were combined in a container to form a liquid reinforcement fiber treatment/coating composition in accordance with certain embodiments of the invention.

| Ingredient Name | Parts by Weight |
| --- | --- |
| Flurosurfactant APFS-70S | 0.50 |
| Water | 400.00 |
| Modified polyolefin Hardlen EW8511 | 80.00 |
| Modified polyolefin Advantis 510W | 40.00 |
| Titanium IV, trisamino ethyl amno ethanol amine DR44 | 5.00 |
| Diethylene glycol monobutylether | 10.00 |
| Monomer sodium vinyl suflfonate | 2.00 |
| Urethane acrylate SR 9035 | 0.50 |
| Polyethylene glycol 400 dimethacrylate SR344 | 0.50 |
| Styrene acrylate pliotec SA 40 | 30.00 |
| Ureaperoxide 1% solution in water | 0.20 |
| Ferrous hemmonium sulfate 1% solnion water | 0.10 |

A plurality of reinforcement fibers were immersed in each of the formulations identified in Examples 1, 2 and 3 in order to at least partially coat and treat the fibers. The treated fibers were subjected to heat curing at a temperature of about 80° C. for about ten minutes. The treated and cured fibers were then mixed with concrete compositions.

We claim:

1. A reinforced cement concrete composition selected from asphalt cement concrete composition and portland cement concrete composition, comprising:
   a plurality of reinforcement fibers each having an outer surface and a treatment layer formed on the outer surface, the treatment layer comprises a treatment composition which comprises:
      a component selected from the group consisting of monomer, prepolymer and mixtures thereof, wherein said component comprises at least one functional group selected from the group consisting of hydroxyl, carboxyl, amino and ester; and
      a graft initiator comprising metallic salt;
   aggregate; and
   binder.

2. The composition of claim 1, wherein the component is selected from the group consisting of urethane, acrylic, vinyl and mixtures thereof.

3. The composition of claim 2, wherein the component is selected from acrylate, diacrylate and mixtures thereof.

4. The composition of claim 2, wherein the component is methacrylate.

5. The composition of claim 1, wherein the graft initiator is selected from the group consisting of silver nitrate, silver perchlorate, ferrous ammonium sulfate, titanium and mixtures thereof.

6. The composition of claim 1, wherein the graft initiator is in the form of a solution.

7. The composition of claim 6, wherein the solution comprises the graft initiator and water.

8. The composition of claim 1, further comprising catalyst.

9. The composition of claim 8, wherein the catalyst is selected from the group consisting of peroxide acid, perbenzoate and mixtures thereof.

10. The composition of claim 1, wherein the graft initiator is present in an amount of from 5 ppm to 10 ppm based on total weight of the composition.

11. A method of reinforcing cement concrete selected from asphalt cement concrete and portland cement concrete, comprising:
    providing a plurality of reinforcement fibers, each of the plurality of reinforcement fibers forming a substrate having an outer surface;
    applying graft initiator to said outer surface of said plurality of reinforcement fibers;
    applying to said graft initiator a component selected from the group consisting of monomer, prepolymer and mixtures thereof, said component comprising at least one functional group selected from the group consisting of hydroxyl, carboxyl, amino, ester and mixtures thereof to form a plurality of treated fibers; and
    adding said plurality of treated fibers to a mixture during preparation of the asphalt and portland cement concrete prior to its placement.

12. The method of claim 11, wherein the applying of the graft initiator is conducted at ambient temperature and atmospheric pressure.

13. The method of claim 11, further comprising drying the graft initiator on the outer surface prior to the applying to said graft initiator the component.

14. The method of claim 11, wherein the plurality of treated fibers provide improved adhesion in the asphalt and portland cement concrete as compared to a plurality of untreated fibers.

* * * * *